(12) United States Patent
Alasti et al.

(10) Patent No.: US 12,317,182 B2
(45) Date of Patent: May 27, 2025

(54) MAPPING SUBSCRIBERS TO OPERATORS IN SHARED RADIO UNIT ARCHITECTURE USING RAN SLICING

(71) Applicant: DISH Wireless L.L.C., Englewood, CO (US)

(72) Inventors: Mehdi Alasti, Arlington, VA (US); Siddhartha Chenumolu, Broadlands, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 420 days.

(21) Appl. No.: 17/886,344

(22) Filed: Aug. 11, 2022

(65) Prior Publication Data
US 2024/0056958 A1  Feb. 15, 2024

(51) Int. Cl.
*H04W 74/08* (2024.01)
*H04W 48/18* (2009.01)
*H04W 74/0833* (2024.01)

(52) U.S. Cl.
CPC ....... *H04W 48/18* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2017/0367120 A1* | 12/2017 | Murray | H04W 74/0833 |
| 2021/0266870 A1 | 8/2021 | Bhandari et al. | |
| 2022/0338300 A1* | 10/2022 | Sun | H04W 28/0289 |
| 2024/0015798 A1* | 1/2024 | Cheng | H04W 48/18 |

FOREIGN PATENT DOCUMENTS

| | | |
|---|---|---|
| KR | 20220017800 A | 2/2022 |
| WO | 2022/031806 A1 | 2/2022 |

OTHER PUBLICATIONS

DOCOMO Communications Lab, "FEAT27 IFA046 adding use case analysis in Annex," *European Telecommunications Standards Institute (ETSI) Draft, Volume NFV IFA Interfaces and Architecture (21)0001069*, Meeting & Allocation NFVIFA#26x, Retrieved from the Internet Dec. 12, 2021. (10 pages).

International Search Report and Written Opinion, mailed Nov. 8, 2023, for International Application PCT/US2023/029663. (52 pages).

* cited by examiner

*Primary Examiner* — Gary Lafontant
(74) *Attorney, Agent, or Firm* — Seed IP Law Group LLP

(57) ABSTRACT

Disclosed is a method for mapping a subscriber to a mobile network operator in a fifth-generation New Radio (5G NR) cellular telecommunication radio access network (RAN). The method is performed by a Radio Unit (RU) device operated by a first network operator and includes: transmitting system information including first information indicating network slices and second information indicating Physical Random Access Channel (PRACH) occasions mapped to the network slices, receiving a preamble of a Random Access Channel (RACH) during one of the PRACH occasions indicated by the second information, determining a second network operator based on the one of the PRACH occasions during which the preamble of the RACH is received, and transmitting the preamble of the RACH to a Distributed Unit (DU) device that is operated by the second network operator determined based on the one of the PRACH occasions during which the preamble of the RACH is received.

19 Claims, 8 Drawing Sheets

| Slice Service Type (SST) | Slice Differentiator (SD) | Mobile Network Operator (MNO) | Physical Resource Blocks (PRBs) | Physical Random Access Channel (PRACH) Occasion |
|---|---|---|---|---|
| 1 | 00000000000000000000000 | Host Operator | PRB-1 to PRB-2 (BW0) | 1 |
| 2 | 00000000000000000000001 | Host Operator | PRB-1 to PRB-2 (BW0) | 1 |
| 3 | 00000000000000000000010 | Host Operator | PRB-1 to PRB-2 (BW0) | 1 |
| 4 | 00000000000000000000011 | Host Operator | PRB-1 to PRB-2 (BW0) | 1 |
| 128 | 00000000000000000000100 | Host Operator | PRB-1 to PRB-2 (BW0) | 1 |
| 1 | 00000000000000000000101 | Guest Operator 1 | PRB-3 to PRB-4 (BW1) | 2 |
| 1 | 00000000000000000000110 | Guest Operator 1 | PRB-3 to PRB-4 (BW1) | 2 |
| 3 | 00000000000000000000111 | Guest Operator 1 | PRB-3 to PRB-4 (BW1) | 2 |
| 4 | 00000000000000000001000 | Guest Operator 1 | PRB-3 to PRB-4 (BW1) | 2 |
| 129 | 00000000000000000001001 | Guest Operator 1 | PRB-3 to PRB-4 (BW1) | 2 |
| 1 | 00000000000000000001010 | Guest Operator 2 | PRB-5 to PRB-6 (BW2) | 3 |
| 2 | 00000000000000000001011 | Guest Operator 2 | PRB-5 to PRB-6 (BW2) | 3 |
| 3 | 00000000000000000001100 | Guest Operator 2 | PRB-5 to PRB-6 (BW2) | 3 |
| 4 | 00000000000000000001101 | Guest Operator 2 | PRB-5 to PRB-6 (BW2) | 3 |
| 130 | 00000000000000000001110 | Guest Operator 2 | PRB-5 to PRB-6 (BW2) | 3 |
| 1 | 00000000000000000001111 | Guest Operator 3 | PRB-7 to PRB-8 (BW3) | 4 |
| 2 | 00000000000000000010000 | Guest Operator 3 | PRB-7 to PRB-8 (BW3) | 4 |
| 3 | 00000000000000000010001 | Guest Operator 3 | PRB-7 to PRB-8 (BW3) | 4 |
| 4 | 00000000000000000010010 | Guest Operator 3 | PRB-7 to PRB-8 (BW3) | 4 |
| 131 | 00000000000000000010011 | Guest Operator 3 | PRB-7 to PRB-8 (BW3) | 4 |

FIG. 3

MAPPING SUBSCRIBERS TO OPERATORS IN SHARED RADIO UNIT ARCHITECTURE USING RAN SLICING

BACKGROUND

Radio Access Network (RAN) slicing capabilities are included in Third Generation Partnership Project (3GPP) Release 17. In addition, Radio Unit (RU) sharing can be used in Open RAN (O-RAN) architectures.

BRIEF SUMMARY

According to the present disclosure, RAN slicing capabilities, for example, as included in 3GPP Release 17 are combined with an O-RAN disaggregated architecture and a novel concept of RU sharing among multiple network operators, in order to map subscribers to their respective network operators in a manner that is more efficient than conventional methods that do use RU sharing.

A method for mapping a subscriber to a mobile network operator in a fifth-generation New Radio (5G NR) cellular telecommunication radio access network (RAN) according to the present disclosure may be characterized as including: transmitting, by a Radio Unit (RU) device operated by a first network operator, system information including first information indicating a plurality of network slices and second information indicating a plurality of Physical Random Access Channel (PRACH) occasions mapped to the network slices; receiving, by the RU device operated by the first network operator, from a UE device, a preamble of a Random Access Channel (RACH) during one of the PRACH occasions mapped to the network slices that is indicated by the second information; determining, by the RU device operated by the first network operator, a second network operator different from the first network operator based on the one of the PRACH occasions mapped to the network slices that is indicated by the second information during which the preamble of the RACH is received; and transmitting, by the RU device operated by the first network operator, the preamble of the RACH and information included in the RACH to a Distributed Unit (DU) device that is operated by the second network operator determined based on the one of the PRACH occasions mapped to the network slices that is indicated by the second information during which the preamble of the RACH is received.

The method may further comprise transmitting, by the RU device operated by the first network operator, information included in the RACH to the DU device that is operated by the second network operator determined based on the one of the PRACH occasions mapped to the network slices that is indicated by the second information during which the preamble of the RACH is received.

The first information may include=a Slice Service Type (SST) value of Single-Network Slice Selection Assistance Information (S-NSSAI) that is stored by the UE device, and the second information indicating the PRACH occasions mapped to the network slices may include a Slice Differentiator (SD) value of the S-NSSAI that is stored by the UE device.

The system information may include a plurality of items of Single-Network Slice Selection Assistance Information (S-NSSAI), each of the items of S-NSSAI may include a Slice Service Type (SST) value that indicates one of the network slices, and each of the items of S-NSSAI includes a Slice Differentiator (SD) value that may indicate one of the PRACH occasions. The SST value included in a first one of the items of S-NSSAI may be same as the SST value included in a second one of the items of S-NSSAI. The one of the PRACH occasions indicated by the SD value included in a first one of the items of S-NSSAI may be same as the one of the PRACH occasions indicated by the SD value included in a second one of the items of S-NSSAI. The SD value included in each of the items of S-NSSAI may be different.

The method may further comprise receiving, by the UE device, information that indicates a bandwidth part from the DU device operated by the second network operator; and receiving, by the RU device operated by the first network operator, data corresponding to one of the network slices indicated by the first information that is transmitted by the UE device using the bandwidth part. The method may further comprise transmitting, by the RU device operated by the first network operator, to the DU device operated by the second network operator, the data corresponding to the one of the network slices indicated by the first information that is transmitted by the UE device using the bandwidth part.

A method for mapping a subscriber to a mobile network operator in a fifth-generation New Radio (5G NR) cellular telecommunication radio access network (RAN) according to the present disclosure may be characterized as including: receiving, by a User Equipment (UE) device, system information including first information indicating a plurality of network slices and second information indicating a plurality of Physical Random Access Channel (PRACH) occasions mapped to the network slices; and transmitting, by the UE device, a preamble of a Random Access Channel (RACH) during one of the PRACH occasions mapped to the network slices indicated by the second information.

The first information may indicates a service type; and the method may further comprise transmitting, by the UE device, data corresponding to the service type.

The first information may include a Slice Service Type (SST) value of Single-Network Slice Selection Assistance Information (S-NSSAI) that is stored by the UE device, and the second information indicating the PRACH occasions mapped to the network slices may include a Slice Differentiator (SD) value of the S-NSSAI that is stored by the UE device.

The system information may include a plurality of items of Single-Network Slice Selection Assistance Information (S-NSSAI), each of the items of S-NSSAI may include a Slice Service Type (SST) value that indicates one of the network slices, and each of the items of S-NSSAI may include a Slice Differentiator (SD) value that indicates one of the PRACH occasions. The SST value included in a first one of the items of S-NSSAI may be same as the SST value included in a second one of the items of S-NSSAI. The one of the PRACH occasions indicated by the SD value included in a first one of the items of S-NSSAI may be same as the one of the PRACH occasions indicated by the SD value included in a second one of the items of S-NSSAI.

A User Equipment (UE) device that operates in a fifth-generation New Radio (5G NR) cellular telecommunication radio access network (RAN) according to the present disclosure may be characterized as including at least one memory that stores computer executable instructions; and at least one processor that executes the computer executable instructions to cause actions to be performed, the actions including: receive system information including first information indicating a plurality of network slices and second information indicating a plurality of Physical Random Access Channel (PRACH) occasions mapped to the network slices; and transmit a preamble of a Random Access Channel (RACH) during one of the PRACH occasions mapped to the network slices indicated by the second information.

The first information may include a Slice Service Type (SST) value of Single-Network Slice Selection Assistance Information (S-NSSAI) that is stored by the UE device, and the second information indicating the PRACH occasions includes a Slice Differentiator (SD) value of the S-NSSAI that is stored by the UE device. The system information may include a plurality of items of Single-Network Slice Selection Assistance Information (S-NSSAI), each of the items of S-NSSAI may include a Slice Service Type (SST) value that indicates one of the network slices, and each of the items of S-NSSAI may include a Slice Differentiator (SD) value that indicates one of the PRACH occasions. The SST value included in a first one of the items of S-NSSAI may be same as the SST value included in a second one of the items of S-NSSAI. The one of the PRACH occasions indicated by the SD value included in a first one of the items of S-NSSAI may be same as the one of the PRACH occasions indicated by the SD value included in a second one of the items of S-NSSAI.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIG. 3 is a diagram illustrating an example of network slice information in accordance with embodiments described herein.

DETAILED DESCRIPTION

3GPP TR 21.917 V0.5.0 (2022-04) (Release 17) mentions "enhancement of RAN Slicing for NR". Slice-based cell selection or reselection may be achieved by broadcasting System Information (SI) that includes supported slice information of a current cell and neighbor cells, and cell reselection priority per slice for cell reselection assistance. Also, a SI message may be included in an RRCRelease message slice for cell reselection assistance. In addition, supported slice of a serving cell in a SI message may be broadcast for cell selection assistance. For Slice based Random Access Channel (RACH) configuration, separated PRACH occasions (e.g., time-frequency domain and preambles) can be configured for each slice or slice group, and RACH parameters prioritization can be configured for each slice or slice group.

A Network Slice Selection Assistance Information (NS-SAI) format has been defined, which includes a Slice/Service Type (SST) value and a Slice Differentiator (SD) value. For example, an SST value of 1 may indicate an enhanced Mobile Broadband (eMBB) Slice/Service Type, an SST value of 2 may indicate an Ultra Reliable Low Latency Communications (URLLC) Slice/Service Type, an SST value of 3 may indicate a massive Internet of Things (mIoT) Slice/Service Type, SST values from 4 to 127 may indicate a standard Slice/Service Type, and SST values from 128 to 255 may indicate an operator-specific Slice/Service Type.

A Single NSSAI (S-NSSAI) having an STT value corresponding to a standard STT with an SD value of null may indicate that all Public Land Mobile Networks (PLMNs) are applicable to the S-NSSAI. Also, an S-NSSAI having an STT value corresponding to an operator-specific STT with an SD value of null may indicate that the S-NSSAI is PLMN specific. Any S-NSSAI having an SD value that is not null may indicate that the S-NSSAI is PLMN specific.

For example, an S-NSSAI having an SST value of 1 and an SD value of null may imply eMBB traffic. Also, an S-NSSAI having an SST value of 3 and an SD value of null may imply IoT traffic. In addition, an S-NSSAI having an SST value of 3 and an SD value that is not null may imply custom IoT traffic.

According to the present disclosure, S-NSSAIs are mapped to particular services, slices, and operators. A set of SD values are split into different disjoint subsets (e.g., SD ranges) and each of the SD value subsets or ranges are assigned to one network operator. Accordingly, network operators can be differentiated based on the SD values of S-NSSAIs. Thus, different S-NSSAIs can be mapped to different network operators. Each network operator has the flexibility to support multiple slices of the same service type. For example, a network operator with an SD value range between 0000 and 000F, can offer multiple eMBB services for an SST value of 1.

Figure 1:
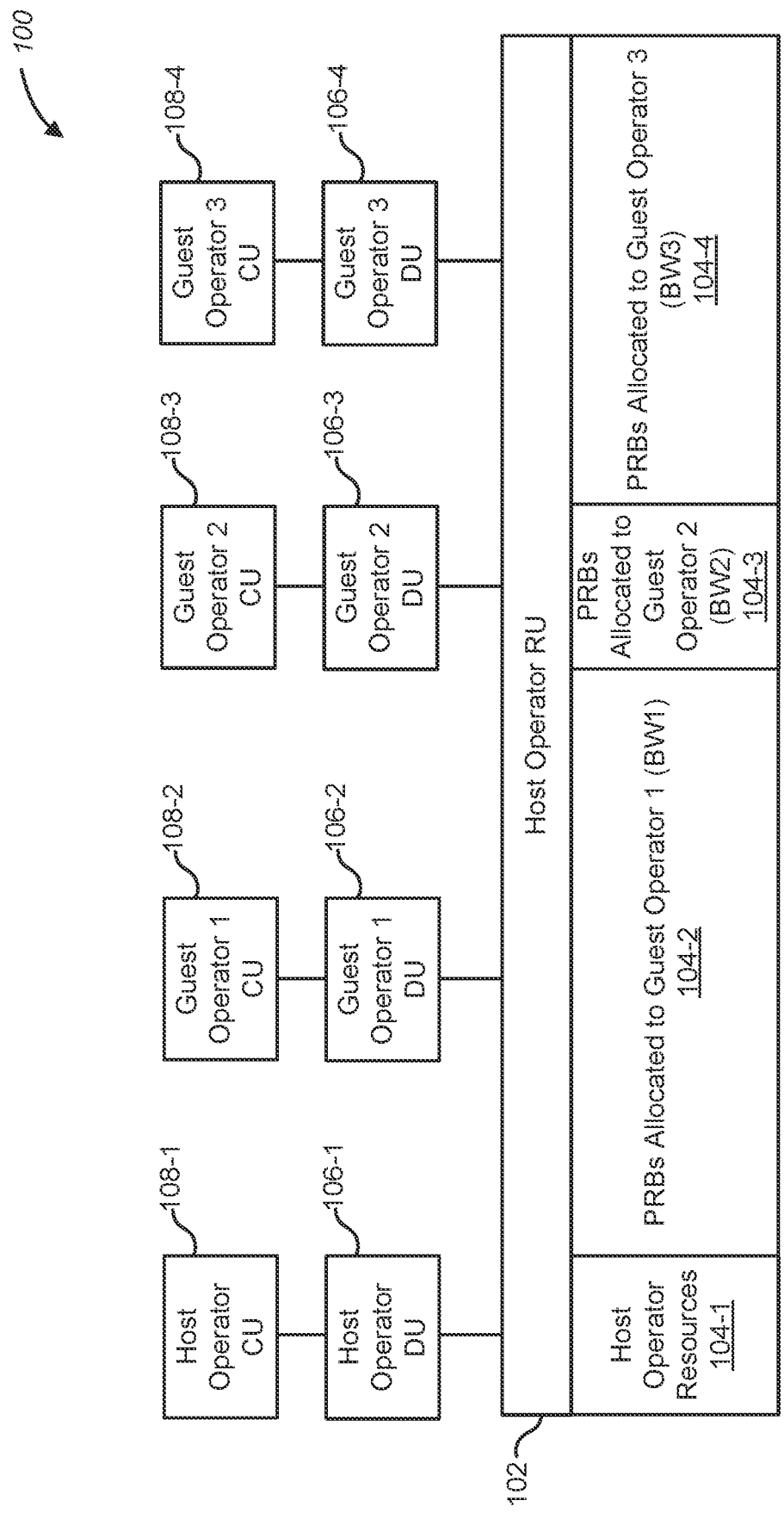
FIG. 1 is a block diagram illustrating a communication system in accordance with embodiments described herein.

FIG. 1 is a block diagram illustrating a communication system 100 in accordance with embodiments described herein. The communication system 100 employs a shared Radio Unit (RU) architecture. More particularly, the communication system 100 includes an RU device 102, which is configured to use resources (e.g., Physical Resource Blocks (PRBs)) 104-1 that are allocated for use by the host network operator, PRBs 104-2 having a bandwidth BW1 allocated to a first guest network operator, PRBs 104-3 having a bandwidth BW2 allocated to a second guest network operator, and PRBs 104-4 having a bandwidth BW3 allocated to a third guest network operator.

The RU device 102 is coupled to a plurality of Distributed Unit (DU) devices, including a DU device 106-1 that is operated by the host network operator, a DU device 106-2 that is operated by the first guest network operator, a DU device 106-3 that is operated by the second guest network operator, and a DU device 106-4 that is operated by the third guest network operator. The DU device 106-1 that is operated by the host network operator is coupled to a Centralized Unit (CU) device 108-1 that is operated by the host network operator. The DU device 106-2 that is operated by the first guest network operator is coupled to a CU device 108-2 that is operated by the first guest network operator. The DU device 106-3 that is operated by the second guest network operator is coupled to a CU device 108-3 that is operated by the second guest network operator. The DU device 106-4 that is operated by the third guest network operator is coupled to a CU device 108-4 that is operated by the third guest network operator.

In FIG. 1, the host network operator owns the RU device 102 that is shared among the host network operator and all the guest network operators. The bandwidth allocation among the host and guest network operators are agreed upon and configured using the 5G BW-Part (BWP) concept. Each network operator owns its own DU device and CU device. The DU devices and CU devices owned by all of the network operators are synchronized to the RU device 102 on both downlink (DL) and uplink (UL). The RU device 102 operated by the host network operator broadcasts Master Information Block (MIB), System Information Block (SIB) Type1 (SIB1) and potentially some other SIBs.

Figure 2:
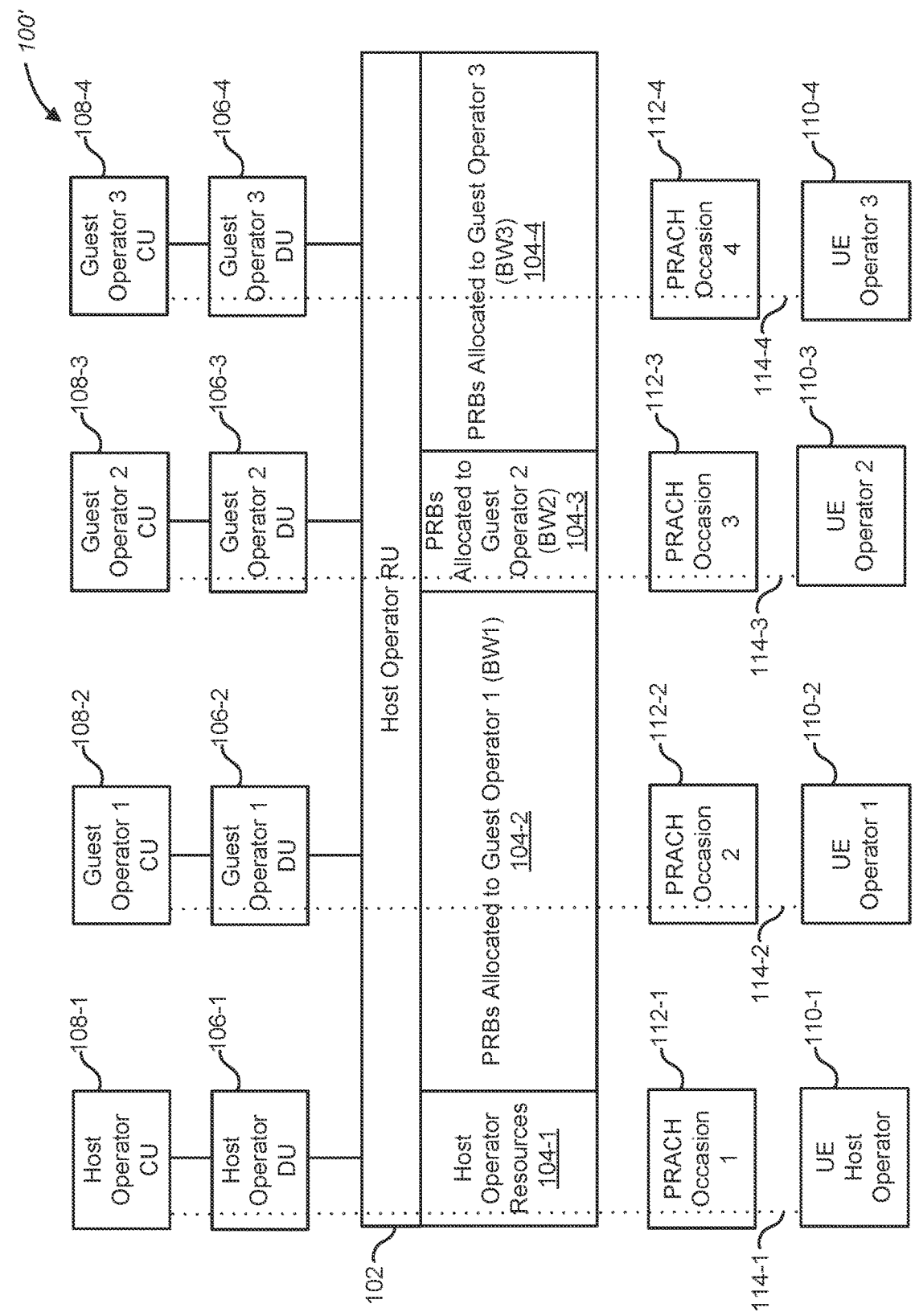
FIG. 2 is a block diagram illustrating another communication system in accordance with embodiments described herein.

FIG. 2 is a block diagram illustrating a communication system 100' in accordance with embodiments described herein. The communication system 100' shown in FIG. 2 is similar in many relevant respects to the system 100 system in FIG. 1. The communication system 100' shown in FIG. 2 includes a plurality of User Equipment (UE) devices, including a UE device 110-1 that is operated by a subscriber of the host network operator, a UE device 110-2 that is operated by a subscriber of the first guest network operator, a UE device 110-3 that is operated by a subscriber of the second guest network operator, and a UE device 110-4 that is operated by a subscriber of the third guest network operator.

In FIG. 2, the host network operator broadcasts the System Information (SI) and the PRACH Occasion for each S-NSSAI in an SI message. Each PRACH occasion can be assigned within the BW (BWP) allocated to the appropriate network operator. Because the communication system 100' allocates separate PRACH occasions to different slices/slice groups (i.e., the slice groups are mapped to different network operators), a UE device will transmit a RACH on the appropriate Physical RACH (PRACH) occasion allocated to its network operator. The communication system 100' knows which network operator an UE device belongs to, immediately upon receipt of the RACH. The RACH is handled by the DU device of the appropriate network operator, instead of being handled by the DU device 106-1 operated by the host network operator as done in conventional techniques, which increases the speed at which information from the RACH is provided to the DU device of the appropriate network operator.

For example, when the UE device 110-1 operated by the subscriber of the host network operator uses a first PRACH occasion 112-1 to transmit a first RACH 114-1 to the RU device 102, the RU device 102 routes or transmits information included in the RACH 114-1 to the DU device 106-1 operated by the host network operator and/or the CU device 108-1 operated by the host network operator. Also, when the UE device 110-2 operated by the subscriber of the first guest network operator uses a second PRACH occasion 112-2 to transmit a second RACH 114-2, the RU device 102 routes information included in the second RACH 114-2 to the DU device 106-2 operated by the first guest network operator and/or the CU device 108-2 operated by the first guest network operator. Additionally, when the UE device 110-3 operated by the subscriber of the second guest network operator uses a third PRACH occasion 112-3 to transmit a third RACH 114-3, the RU device 102 routes or transmits information included in the third RACH 114-3 to the DU device 106-3 operated by the second guest network operator and/or the CU device 108-3 operated by the second guest network operator. In addition, when the UE device 110-4 operated by the subscriber of the third guest network operator uses a fourth PRACH occasion 112-4 to transmit a fourth RACH 114-4, the RU device 102 routes or transmits information included in the fourth RACH 114-4 to the DU device 106-4 operated by the third guest network operator and/or the CU device 108-4 operated by the third guest network operator.

FIG. 3 is a diagram illustrating an example of network slice information 300 in accordance with embodiments described herein. The network slice information 300 shown in FIG. 3 is simplified for ease of illustration. The network slice information 300 may be used to configure the communication system 100' shown in FIG. 2. The network slice information 300 may be stored in a table, wherein each row of the table represent an item of network slice information and each column of the table represent a field of each item of network slice information. More particularly, each item of network slide information includes a Slice Service Type (SST) value, which is associated with a system-unique Slice Differentiator (SD) value, a value indicating a Mobile Network Operator (MNO), a value indicating one or more Physical Resource Blocks (PRBs) corresponding to a bandwidth part, and a value indicating a Physical Random Access Channel (PRACH) occasion.

Figure 4:
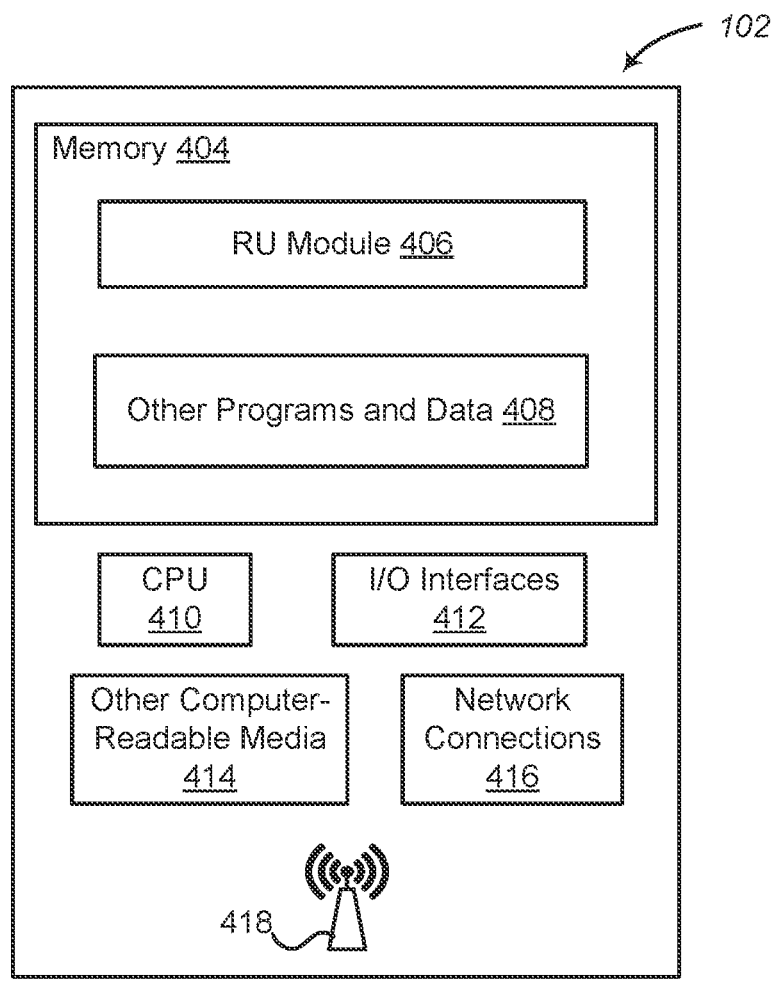
FIG. 4 is a block diagram illustrating an example of a Radio Unit (RU) device in accordance with embodiments described herein.

FIG. 4 is a block diagram illustrating an example of a Radio Unit (RU) device 102 in accordance with embodiments described herein. In some embodiments, one or more special-purpose computing systems may be used to implement the RU device 102. Accordingly, various embodiments described herein may be implemented in software, hardware, firmware, or in some combination thereof. The RU device 102 may include one or more memory devices 404, one or more central processing units (CPUs) 410, I/O interfaces 412, other computer-readable media 414, and network connections 416.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein.

The one or more memory devices 404 may have stored thereon a Radio Unit (RU) module 406. The Radio Unit (RU) module 406 23 configured to implement and/or perform some or all of the functions of the RU device 102 described herein and interface with radio transceiver 418. The one or more memory devices 404 may also store other programs and data 408, which may include PRACH information indicating one or more PRACH occasions that are associated with host and guest network operators (e.g., the network slice information 300 shown in FIG. 3), RU digital certificates, connection recovery algorithms, connection recovery rules, network protocols, O-RAN operating rules, user interfaces, operating systems, etc.

Network connections 416 are configured to communicate with other computing devices including a Distributed Unit (DU) device. In various embodiments, the network connections 416 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 412 may include enhanced Common Public Radio Interface (eCPRI) ports, Antenna Interface Standards Group (AISG) interfaces, other data input or output interfaces, or the like. Other computer-readable media 414 may include other types of stationary or removable computer-readable media, such as removable flash drives, external hard drives, or the like.

Figure 5:
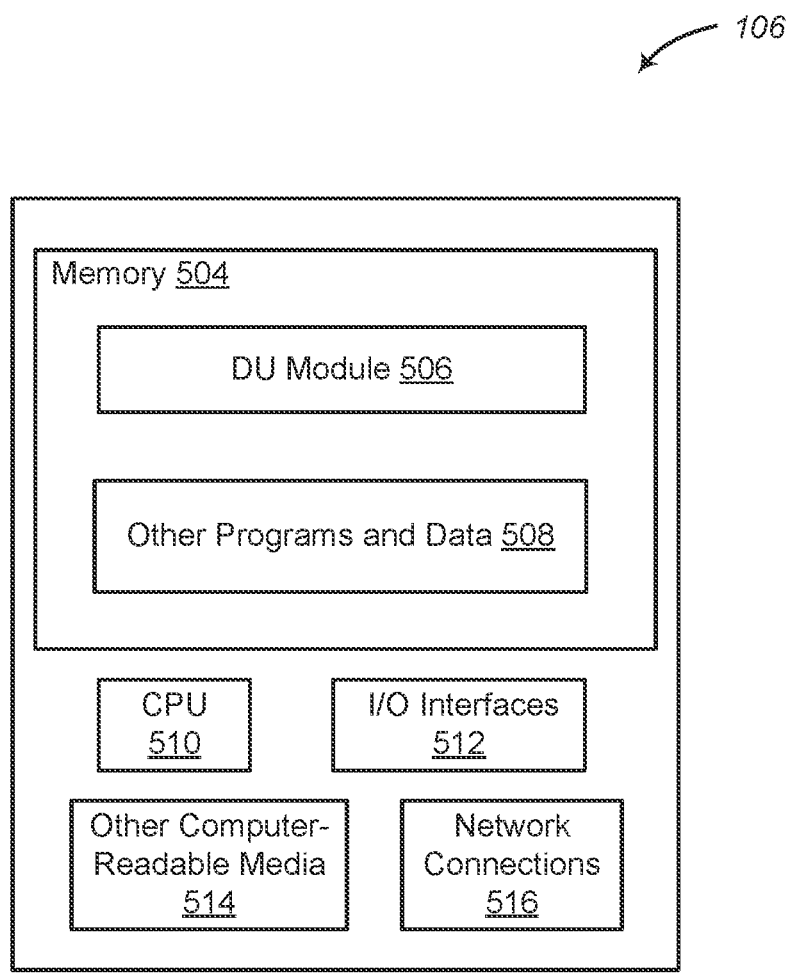
FIG. 5 is a block diagram illustrating an example of a Distributed Unit (DU) device in accordance with embodiments described herein.

FIG. 5 is a block diagram illustrating an example of a Distributed Unit (DU) device 106 in accordance with embodiments described herein. In some embodiments, one or more special-purpose computing systems may be used to implement the Distributed Unit (DU) device 106. Accordingly, various embodiments described herein may be implemented in software, hardware, firmware, or in some combination thereof. The DU device 106 may include one or more memory devices 504, one or more central processing units (CPUs) 510, I/O interfaces 512, other computer-readable media 514, and network connections 516.

The one or more memory devices 504 may include one or more various types of non-volatile and/or volatile storage technologies. Examples of the one or more memory devices 504 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 504 may be utilized to store information, including computer-readable instructions that are utilized by the one or more CPUs 510 to perform actions, including those of embodiments described herein.

The one or more memory devices 504 may have stored thereon a Distributed Unit (DU) module 506. The Distributed Unit (DU) module 506 is configured to implement and/or perform some or all of the functions of the Distributed Unit (DU) 502 described herein. The one or more memory devices 504 may also store other programs and data 508, which may include a Radio Link Control (RLC) module that implements a RLC sublayer of the 5G NR protocol stack, which interfaces to PDCP sublayer from above and MAC sublayer from below, a Media Access Control (MAC) module that implements a MAC sublayer of the 5G NR protocol stack, which interfaces to the RLC sublayer from above and a Physical (PHY) layer from below, and a PHY module that implements the PHY layer for Enhanced Mobile Broadband (eMBB) communications, Machine-Type-Communications (mMTC), and Ultra-Reliable Low Latency Communications (URLLC).

Network connections 516 are configured to communicate with other computing devices including one or more Radio Unit (RU) devices, a Centralized Unit (CU) device, and a RAN Intelligent Controller (RIC) device. In various embodiments, the network connections 516 include transmitters and receivers, a layer 3 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 512 may include PCI interfaces, PCI-Express interfaces, other data input or output interfaces, or the like. Other computer-readable media 514 may include other types of stationary or removable computer-readable media, such as removable flash drives, external hard drives, or the like.

Figure 6:
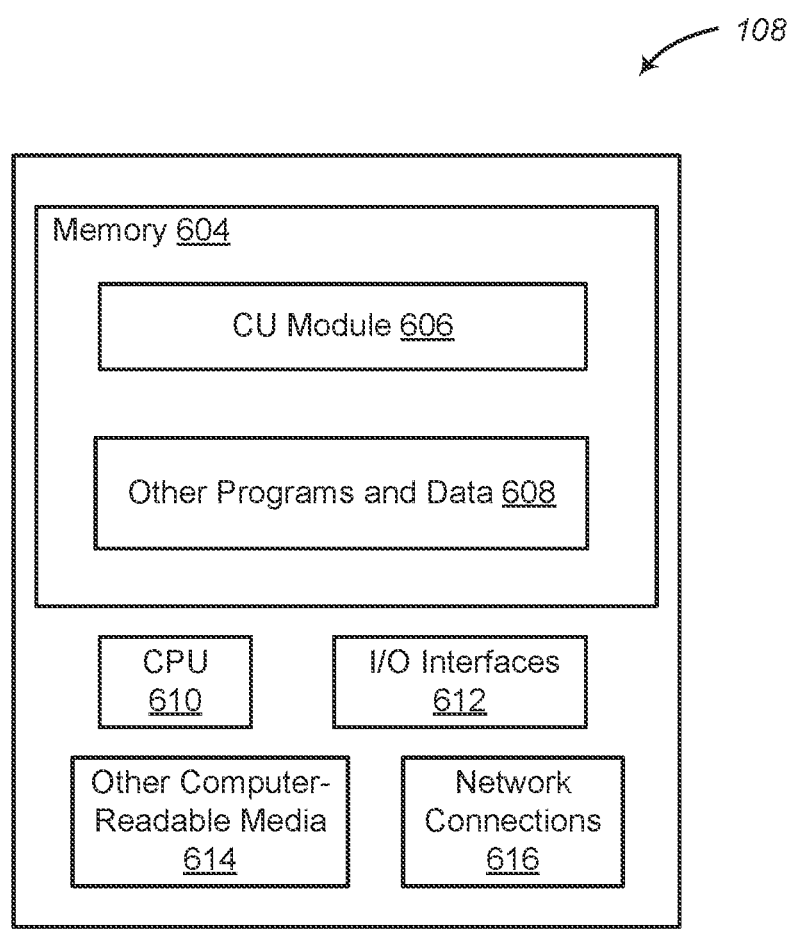
FIG. 6 is a block diagram illustrating an example of a Centralized Unit (CU) device in accordance with embodiments described herein.

FIG. 6 is a block diagram illustrating an example of a Centralized Unit (CU) device 108 in accordance with embodiments described herein. In some embodiments, one or more special-purpose computing systems may be used to implement the Centralized Unit (CU) device 108. Accordingly, various embodiments described herein may be implemented in software, hardware, firmware, or in some combination thereof. The DU device 106 may include one or more memory devices 604, one or more central processing units (CPUs) 610, I/O interfaces 612, other computer-readable media 614, and network connections 616.

The one or more memory devices 604 may include one or more various types of non-volatile and/or volatile storage technologies. Examples of the one or more memory devices 604 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 604 may be utilized to store information, including computer-readable instructions that are utilized by the one or more CPUs 610 to perform actions, including those of embodiments described herein.

The one or more memory devices 604 may have stored thereon a Centralized Unit (CU) module 606. The Centralized Unit (CU) module 606 is configured to implement and/or perform some or all of the functions of the Centralized Unit (CU) 602 described herein. The one or more memory devices 604 may also store other programs and data 608, which may include Radio Resource Control (RRC) module that implements an RRC a layer within the 5G NR protocol stack in a control plane of a gNB, a Service Data Adaptation Protocol (SDAP) module that implements a sublayer in a plane in the gNB, and a Packet Data Convergence Protocol (PDCP) module that implements a PDCP layer within the 5G NR protocol stack.

Network connections 616 are configured to communicate with other computing devices including one or more Radio Unit (RU) devices, one or more Distributed Unit (CU) devices, one or more devices that implement Access and Mobility Management Function (AMF) operations, and one or more devices that implement User Plane Function (UPF) operations. In one or more implementations, the network connections 616 includes connections made via N2, N3, F1-C, and F1-U interfaces, for example.

Figure 7:
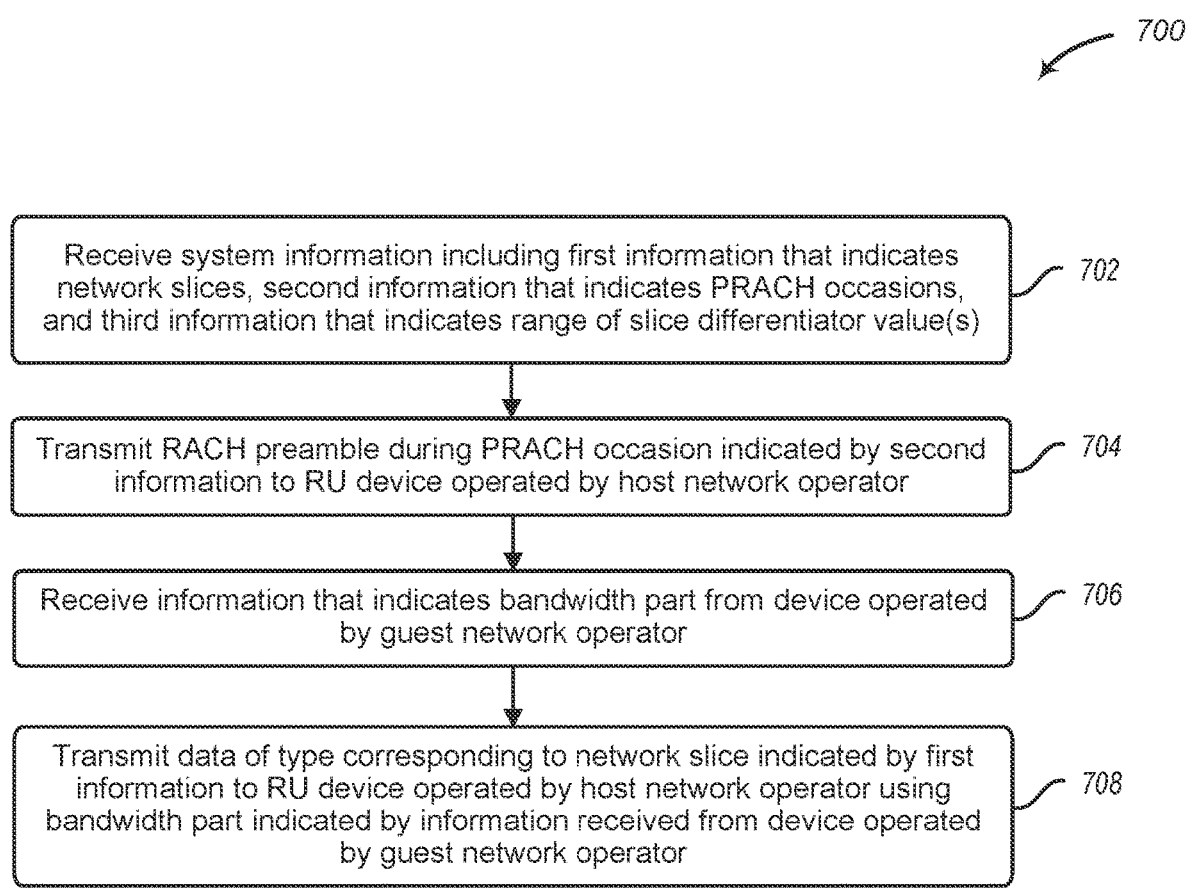
FIG. 7 illustrates a logical flow diagram showing an example of a method of operating a UE device in accordance with embodiments described herein.

FIG. 7 illustrates a logical flow diagram showing an example of a method 700 of operating a UE device in accordance with embodiments described herein. The method 700 begins at 702.

At 702, the UE device receives system information including first information that indicates a plurality of network slices, second information that indicates a plurality of Physical Random Access Channel (PRACH) occasions mapped to the network slices, and third information that indicates a range of one or more Slice Differentiator (SD) values (i.e., an SD range) associated with the network slices.

For example, the UE device 110-2 operated by the subscriber of the first guest network operator receives first information that indicates a plurality of SST values (e.g., 1, 2, 3) corresponding to a plurality of slice service types (e.g., eMBB, URLLC, MIoT), second information that indicates a plurality of PRACH occasions (e.g., information that indicates the PRACH occasions 2, 3, 4), and third information that indicates a plurality of SD ranges (e.g., 00000000000000000000101-00000000000000000000-1001, 00000000000000000001010-0000000000000000-00001110, 00000000000000000001111-0000000000000000-00000010011) associated with the network slices. Up to eight items of Single-Network Slice Selection Assistance Information (S-NSSAI) may be stored by and configured in the UE device 110-2. The UE device 110-2 maps the items of S-NSSAI that have an SD value included in the SD range indicated by the third information received at 702 to the PRACH occasions indicated by the second information received at 702. The method 700 then proceeds to 704.

At 704, the UE device transmits a preamble of a RACH during the PRACH occasion indicated by the second information received at 702. For example, the UE device 110-2 operated by the subscriber of the first guest network operator transmits a preamble of the RACH 114-2 during the second PRACH occasion 112-2 shown in FIG. 2. The method 700 then proceeds to 706.

At 706, the UE device receives information that indicates a bandwidth part from a device operated by a guest network operator. For example, after the UE device 110-2 operated by the subscriber of the first guest network operator has been successfully authenticated, and Radio Resource Control (RRC) and Non-Access-Stratum (NAS) have been established between the UE device 110-2 and the CU device 108-2 operated by the first guest network operator and a device operated by the first guest network operator that performs an Access and Mobility Management Function (AMF), respectively, the UE device 110-2 receives information that indicates a contiguous set of Physical Resource Blocks (PRBs) on a particular carrier frequency (e.g., bandwidth part BW1 shown in FIG. 2) from the CU device 108-2 or the DU device 106-2 by RRC signaling. The method 700 then proceeds to 708.

At 708, the UE device transmits data corresponding to the service type indicated by the first information received at 702 to an RU device operated by the host network operator using the bandwidth part indicated by the information received from the device operated by the guest network operator at 706. For example, the system information received at 702 includes first information that indicates an SST value of 1, which corresponds to an eMBB slice/service type, and the UE device 110-2 operated by the subscriber of the first guest network operator transmits eMBB data to the RU device 102 operated by the host network operator using the bandwidth part indicated by the information indicating the bandwidth part received from the CU device 108-2 operated by the first guest network operator (e.g., bandwidth part BW1 shown in FIG. 2). The method 700 then ends.

Figure 8:
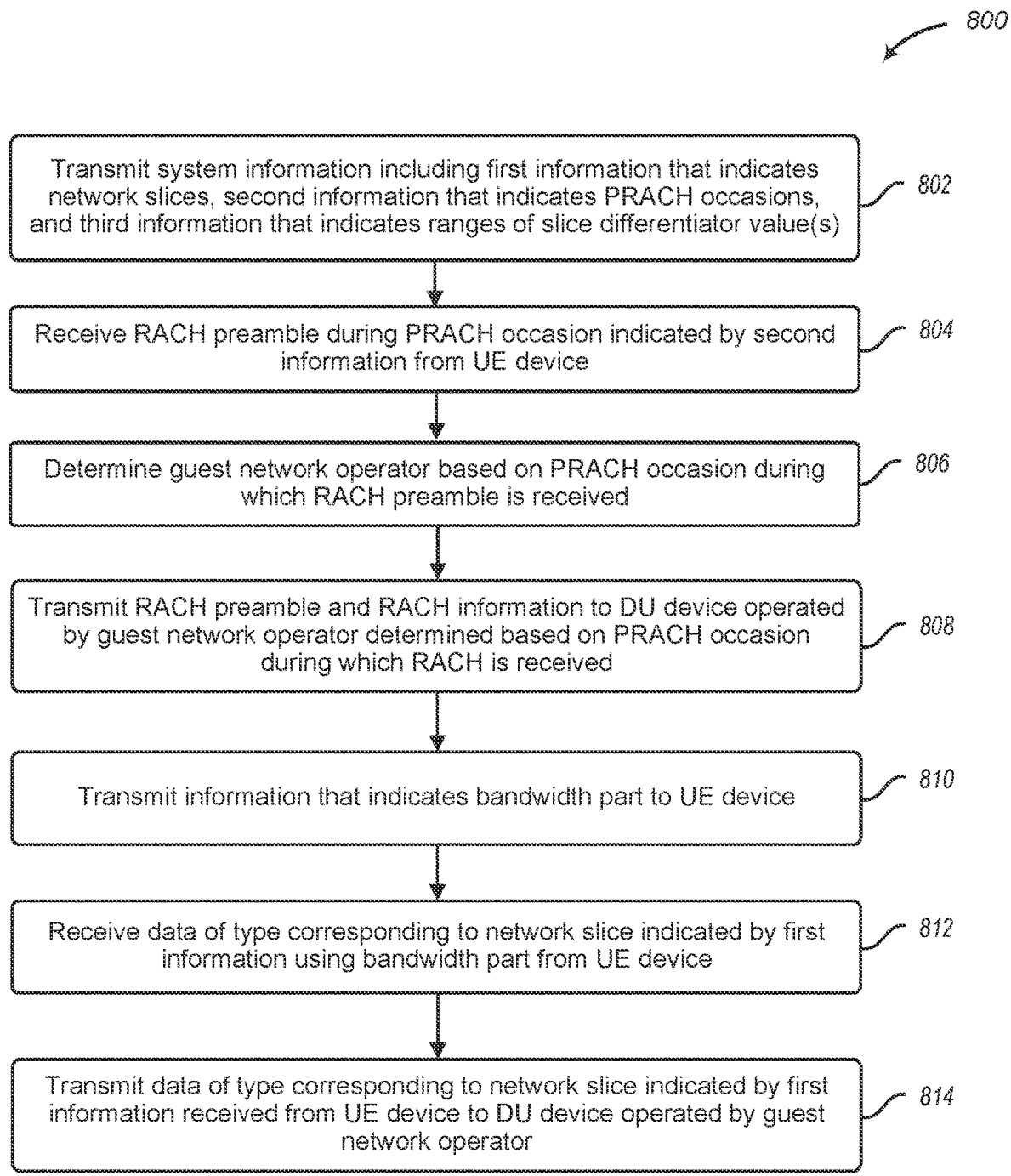
FIG. 8 illustrates a logical flow diagram showing an example of a method of operating a RU device in accordance with embodiments described herein.

FIG. 8 illustrates a logical flow diagram showing an example of a method 800 of operating a RU device in accordance with embodiments described herein. The method 800 begins at 802.

At 802, the RU device transmits system information including first information that indicates a plurality of network slices, second information that indicates a plurality of Physical Random Access Channel (PRACH) occasions mapped to the network slices, and third information that indicates ranges of one or more Slice Differentiator (SD) values (i.e., SD ranges) associated with the network slice. For example, the RU device 102 operated by the host network operator transmits system information including first information that indicates a plurality of SST values (e.g., 1, 2, 3) corresponding to a plurality of slice service types (e.g., eMBB, URLLC, MIoT) for the network slices, second information that indicates a plurality of PRACH occasions (e.g., information that indicates PRACH occasions 2, 3, 4), and third information that indicates a plurality of SD ranges (e.g., 00000000000000000000101-00000000000000000001001, 000000000000000000-001010-00000000000000000001110, 00000000000-0000000001111-00000000000000000010011). The method 800 then proceeds to 804.

At 804, the RU device receives a RACH preamble during one of the PRACH occasions indicated by the second information transmitted at 802. For example, the RU device 102 operated by the host network operator receives a preamble of the RACH 114-2 shown in FIG. 2 during the second PRACH occasion 112-2 shown in FIG. 2 from the UE device 110-2 operated by the subscriber of the first guest network operator. The method 800 then proceeds to 806.

At 806, the RU device determines a network operator based on the PRACH occasion during which the RACH preamble is received at 804. For example, the RU device 102 uses the network slice information 300 shown in FIG. 3 to determine that the network operator corresponding to the RACH 114-2 is the first guest network operator (e.g., Guest Operator 1) based on the preamble of the RACH 114-2 being received during PRACH occasion 2 (e.g., the second PRACH occasion 112-2 shown in FIG. 2). The method 800 then proceeds to 808.

At 808, the RU device transmits the preamble of the RACH received at 804 and information included in the RACH received at 804 to a DU device operated by the network operator determined at 806. For example, the RU device 102 stores an Internet Protocol (IP) address in association with an identifier of the first guest network operator (e.g., Guest Operator 1) and uses that IP address to route the preamble of the RACH 114-2 and information included in the RACH 114-2 to the DU device 106-2 operated by the first guest network operator and/or the CU device 108-2 operated by the first guest network operator. The method 800 then proceeds to 810.

At 810, a device operated by the guest network operator transmits information that indicates a bandwidth part to the UE device. For example, after the UE device 110-2 operated by the subscriber of the first guest network operator has been successfully authenticated, and Radio Resource Control (RRC) and Non-Access-Stratum (NAS) have been established between the UE device 110-2 and the CU device 108-2 operated by the first guest network operator and a device operated by the first guest network operator that performs an Access and Mobility Management Function (AMF), respectively, the CU device 108-2 transmits information that indicates a contiguous set of Physical Resource Blocks (PRBs) on a particular carrier frequency (e.g., bandwidth part BW1 shown in FIG. 2) to the UE device 110-2. The method 800 then proceeds to 812.

At 812, the RU device receives data of a type corresponding to the one of the network slices indicated by first information transmitted by the UE device using the bandwidth part. For example, the RU device 102 receives eMBB data that is transmitted by the UE device 110-2 using the bandwidth part BW1 shown in FIG. 2. The method 800 then proceeds to 814.

At 814, the RU device transmits the data received at 812 to the DU device operated by guest network operator. For example, the RU device 102 transmits the eMBB data received at 812 to the DU device 106-2 operated by the first guest network operator operated by the first guest network operator. In one or more implantations, the RU device 102 determines that the eMBB data is to be transmitted to the based on the bandwidth part (e.g., bandwidth part BW1 shown in FIG. 2), using the network slice information 300 shown in FIG. 3. The method 800 then ends.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for mapping a subscriber to a mobile network operator in a fifth-generation New Radio (5G NR) cellular telecommunication radio access network (RAN), the method comprising:
   transmitting, by a Radio Unit (RU) device operated by a first network operator, system information including first information indicating a plurality of network slices and second information indicating a plurality of Physical Random Access Channel (PRACH) occasions mapped to the network slices;
   receiving, by the RU device operated by the first network operator, from a UE device, a preamble of a Random Access Channel (RACH) during one of the PRACH occasions mapped to the network slices that is indicated by the second information;
   determining, by the RU device operated by the first network operator, a second network operator different from the first network operator based on the one of the PRACH occasions mapped to the network slices that is indicated by the second information during which the preamble of the RACH is received;
   transmitting, by the RU device operated by the first network operator, the preamble of the RACH and information included in the RACH to a Distributed Unit (DU) device that is operated by the second network operator determined based on the one of the PRACH occasions mapped to the network slices that is indicated by the second information during which the preamble of the RACH is received; and
   receiving, by the RU device operated by the first network operator, data corresponding to one of the network slices indicated by the first information that is transmitted by the UE device using a bandwidth part identified to the UE device by the DU device that is operated by the second network operator.

2. The method according to claim 1, further comprising:
   transmitting, by the RU device operated by the first network operator, information included in the RACH to the DU device that is operated by the second network operator determined based on the one of the PRACH occasions mapped to the network slices that is indicated by the second information during which the preamble of the RACH is received.

3. The method according to claim 1, wherein:
   the first information includes a Slice Service Type (SST) value of Single-Network Slice Selection Assistance Information (S-NSSAI) that is stored by the UE device, and
   the second information indicating the PRACH occasions mapped to the network slices includes a Slice Differentiator (SD) value of the S-NSSAI that is stored by the UE device.

4. The method according to claim 1, wherein:
   the system information includes a plurality of items of Single-Network Slice Selection Assistance Information (S-NSSAI),
   each of the items of S-NSSAI includes a Slice Service Type (SST) value that indicates one of the network slices, and
   each of the items of S-NSSAI includes a Slice Differentiator (SD) value that indicates one of the PRACH occasions.

5. The method according to claim 4, wherein:
   the SST value included in a first one of the items of S-NSSAI is same as the SST value included in a second one of the items of S-NSSAI.

6. The method according to claim 4, wherein:
   the one of the PRACH occasions indicated by the SD value included in a first one of the items of S-NSSAI is same as the one of the PRACH occasions indicated by the SD value included in a second one of the items of S-NSSAI.

7. The method according to claim 4, wherein:
   the SD value included in each of the items of S-NSSAI is different.

8. The method according to claim 1, further comprising:
   transmitting, by the RU device operated by the first network operator, to the DU device operated by the second network operator, the data corresponding to the one of the network slices indicated by the first information that is transmitted by the UE device using the bandwidth part.

9. A method for mapping a subscriber to a mobile network operator in a fifth-generation New Radio (5G NR) cellular telecommunication radio access network (RAN), the method comprising:
   receiving, by a User Equipment (UE) device from a Radio Unit (RU) operated by a first network operator, system information including first information indicating a plurality of network slices and second information indicating a plurality of Physical Random Access Channel (PRACH) occasions mapped to the network slices, wherein a network slice of the network slices corresponds to a Distributed Unit (DU) device that is operated by a second network operator;
   transmitting, by the UE device, a preamble of a Random Access Channel (RACH) during one of the PRACH occasions mapped to the network slice indicated by the second information;
   receiving, by the UE device and from the DU device that is operated by the second network operator, information that indicates a bandwidth part; and
   transmitting, by the UE device, data corresponding to the network slice indicated by the first information using the bandwidth part.

10. The method according to claim 9, wherein:
    the first information indicates a service type; and
    the method further comprises:
    transmitting, by the UE device, data corresponding to the service type.

11. The method according to claim 9, wherein:
    the first information includes a Slice Service Type (SST) value of Single-Network Slice Selection Assistance Information (S-NSSAI) that is stored by the UE device, and the second information indicating the PRACH occasions mapped to the network slices includes a Slice Differentiator (SD) value of the S-NSSAI that is stored by the UE device.

12. The method according to claim 9, wherein:
the system information includes a plurality of items of Single-Network Slice Selection Assistance Information (S-NSSAI),
each of the items of S-NSSAI includes a Slice Service Type (SST) value that indicates one of the network slices, and
each of the items of S-NSSAI includes a Slice Differentiator (SD) value that indicates one of the PRACH occasions.

13. The method according to claim 12, wherein:
the SST value included in a first one of the items of S-NSSAI is same as the SST value included in a second one of the items of S-NSSAI.

14. The method according to claim 12, wherein:
the one of the PRACH occasions indicated by the SD value included in a first one of the items of S-NSSAI is same as the one of the PRACH occasions indicated by the SD value included in a second one of the items of S-NSSAI.

15. A User Equipment (UE) device that operates in a fifth-generation New Radio (5G NR) cellular telecommunication radio access network (RAN), the UE device comprising:
at least one memory that stores computer executable instructions; and
at least one processor that executes the computer executable instructions to cause actions to be performed, the actions including:
receive, from a Radio Unit (RU) operated by a first network operator, system information including first information indicating a plurality of network slices and second information indicating a plurality of Physical Random Access Channel (PRACH) occasions mapped to the network slices, wherein a network slice of the plurality of network slices corresponds to a Distributed Unit (DU) device that is operated by a second network operator;
transmit a preamble of a Random Access Channel (RACH) during one of the PRACH occasions mapped to a network slice indicated by the second information;
receive, from the DU device that is operated by the second network operator, information that indicates a bandwidth part; and
transmit data corresponding to the network slice indicated by the first information using the bandwidth part.

16. The UE device according to claim 15, wherein:
the first information includes a Slice Service Type (SST) value of Single-Network Slice Selection Assistance Information (S-NSSAI) that is stored by the UE device, and
the second information indicating the PRACH occasions includes a Slice Differentiator (SD) value of the S-NSSAI that is stored by the UE device.

17. The UE device according to claim 15, wherein:
the system information includes a plurality of items of Single-Network Slice Selection Assistance Information (S-NSSAI),
each of the items of S-NSSAI includes a Slice Service Type (SST) value that indicates one of the network slices, and
each of the items of S-NSSAI includes a Slice Differentiator (SD) value that indicates one of the PRACH occasions.

18. The UE device according to claim 17, wherein:
the SST value included in a first one of the items of S-NSSAI is same as the SST value included in a second one of the items of S-NSSAI.

19. The UE device according to claim 17, wherein:
the one of the PRACH occasions indicated by the SD value included in a first one of the items of S-NSSAI is same as the one of the PRACH occasions indicated by the SD value included in a second one of the items of S-NSSAI.

* * * * *